(12) United States Patent
Kuniyasu

(10) Patent No.: US 8,235,082 B2
(45) Date of Patent: Aug. 7, 2012

(54) PNEUMATIC TIRE

(75) Inventor: Yasuaki Kuniyasu, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 610 days.

(21) Appl. No.: 12/226,225

(22) PCT Filed: May 1, 2007

(86) PCT No.: PCT/JP2007/059301
§ 371 (c)(1),
(2), (4) Date: Oct. 10, 2008

(87) PCT Pub. No.: WO2007/129638
PCT Pub. Date: Nov. 15, 2007

(65) Prior Publication Data
US 2009/0188601 A1   Jul. 30, 2009

(30) Foreign Application Priority Data

May 8, 2006 (JP) .................. 2006-129382

(51) Int. Cl.
*B60C 15/00* (2006.01)
*B60C 15/06* (2006.01)

(52) U.S. Cl. ........ 152/539; 152/541; 152/543; 152/550; 152/552; 152/554

(58) Field of Classification Search .................. 152/554, 152/539, 541, 546, 547, 548, 550, 552
See application file for complete search history.

(56) References Cited

U.S. PATENT DOCUMENTS

| 4,019,551 A * | 4/1977 | Kolowski et al. ............ 152/541 |
| 5,526,863 A * | 6/1996 | Hodges .......................... 152/541 |
| 2004/0261928 A1* | 12/2004 | Imhoff et al. ................. 152/565 |

FOREIGN PATENT DOCUMENTS

| JP | 58-93605 A | 6/1983 |
| JP | 8-48118 A | 2/1996 |
| JP | 2003-170711 A | 6/2003 |
| JP | 2004-123049 A | 4/2004 |
| JP | 2005-343334 A | 12/2005 |

\* cited by examiner

*Primary Examiner* — Justin Fischer
(74) *Attorney, Agent, or Firm* — Birch, Stewart, Kolasch & Birch LLP

(57) ABSTRACT

A pneumatic tire including bead apex rubbers 8 having a rubber hardness Hs1 of 80 to 95 and extending radially outward from bead cores 5, and clinch rubbers 9 having a rubber hardness Hs2 of 65 to 85 lower than the rubber hardness Hs1 and forming outer surfaces of bead portions. A carcass 6 is formed of an inner carcass ply 6A comprising a body portion 11 extending between bead cores 5, 5 and turnup portions 12 which are continuous with the body portion 11 and are turned up around the bead cores 5, and an outer carcass ply 6B comprising a body portion 13 which extends along the outer surface of the body portion 11, and the radially inner ends of which are sandwiched between the body portion 11 and the bead apex rubbers 8 to terminate there. The turnup height Lc of the turnup portion 12 from the bead base line BL is 60% or less of the tire section height L, and the height Ld of inner ends of the body portion 13 is 60% or less of the height L1 of the bead apex rubber 8.

2 Claims, 2 Drawing Sheets

PNEUMATIC TIRE

TECHNICAL FIELD

The present invention relates to a pneumatic tire capable of exhibiting an excellent pinch cut resistance while suppressing deterioration of ride comfortability and noise performance.

BACKGROUND ART

With development of high speed vehicles and high performance vehicles, development of pneumatic tires having a low aspect ratio has been promoted and, in recent years, low aspect ratio tires having an aspect ratio of 50% or less have also been popularly used. However, in case of low aspect ratio tires, since the radial height of the sidewall portions thereof is small, the sidewall portions are greatly deformed so as to be sandwiched between a road and a rim flange when the tire falls into a large depression in a road or runs onto a projection such as curbstone on a road. Thus, tire damages such as cutting of carcass cords or separation of carcass cords from a rubber, i.e., so-called pinch cut, are easy to occur owing to bending occurring locally at the time of the deformation.

Accordingly, in conventional tires, it has been attempted to improve the pinch cut resistance by reinforcing a carcass which constitutes the framework of a tire in such a manner as forming the carcass from two carcass plies, both end portions of which are turned up around bead cores.

DISCLOSURE OF THE INVENTION

Problem to be Solved by the Invention

However, this manner has a problem that the ride comfortability is greatly deteriorated since the tire rigidity is greatly increased as compared with a carcass formed of a single carcass ply. Further, there arises a problem that a road noise increases since a resonance frequency in the circumferential direction of tire increases.

Accordingly, it is an object of the present invention to provide a pneumatic tire capable of greatly improving the pinch cut resistance while suppressing deterioration of the ride comfortability and the noise performance such as road noise low, namely while keeping these performances on approximately the same level as those achieved by a single carcass ply structure.

Patent Literature 1: JP-A-2003-170711
Patent Literature 2: JP-A-2005-343334

Means to Solve the Invention

In order to achieve the object mentioned above, the present invention as claimed in claim 1 provides a pneumatic tire including a carcass which extends from a tread portion to bead cores in bead portions through sidewall portions, bead apex rubbers extending radially outward from the bead cores, and clinch rubbers for preventing slippage of a rim which are disposed axially outward of the bead apex rubbers to form outer surfaces of the bead portions, wherein:

the carcass comprises an inner carcass ply including a body portion extending between the bead cores and turnup portions which are continuous with the body portion and are turned up around the bead cores from the axially inward to the axially outward of the tire, and an outer carcass ply including a body portion which extends along the outer surface of the body portion of the inner carcass ply and the radially inner ends of which are sandwiched between the body portion of the inner carcass ply and each of the bead apex rubbers to terminate there, the turnup radial height Lc of a radially outer end of the turnup portion of the inner carcass ply from the bead base line is 60% or less of the section height L of the tire, and the inner end radial height Ld of a radially inner end of the body portion of the outer carcass ply from the bead base line is 60% or less of the apex radial height L1 of a radially outer end of the bead apex rubber from the bead base line, and the bead apex rubbers have a rubber hardness Hs1 of 80 to 95, and the clinch rubbers have a rubber hardness Hs2 which falls within the range of 65 to 85 and is lower than the rubber hardness Hs1.

The invention as claimed in claim 2 is characterized in that the bead apex rubber comprises an apex main part having an approximately triangular cross section which extends radially outwardly in a tapered manner from the bead core, and a thin wing part having a substantially constant thickness T within the range of 0.8 to 1.5 mm which is continuous with the apex main part and extends radially outwardly therefrom, the apex height L1 is from 30 to 40% of the tire section height L, and the apex main part height L1$a$ which is a radial height of a radially outer end of the apex main part from the bead base line is from 25 to 35% of the apex height L1.

The invention as claimed in claim 3 is characterized in that the clinch radial height L2 between a radially outer end of the clinch rubber and the bead base line is from 70 to 85% of the apex height L1, and the clinch rubber has a maximum thickness part at which the thickness of the clinch rubber becomes maximum, in which the maximum thickness part height L2$a$ between the thickness center of the maximum thickness part and the bead base line is from 65 to 95% of the apex main part height L1$a$, and the maximum thickness of the maximum thickness part is from 4.0 to 5.0 mm.

In the specification, the "dimensions" and so on of respective parts of a tire denotes values determined under a 5% inner pressure condition that 5% of a normal inner pressure is applied to the tire mounted on a normal rim, unless otherwise noted. The "rubber hardness Hs" mentioned above denotes a Durometer A hardness measured by a durometer type A according to JIS K 6253. The "normal rim" mentioned above denotes a rim defined for every tire in a standardizing system on which the tire is based and is, for example, the "standard rim" in JATMA, the "Design Rim" in TRA and the "Measuring Rim" in ETRTO. The "normal inner pressure" mentioned above denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO, provided that in case of tires for passenger cars, the "normal inner pressure" is 180 kPa.

Effects of the Invention

Since the present invention is constructed as mentioned above, a neighborhood of a tire maximum width position at which the deflection is maximum and pinch cut is easy to occur, can be reinforced by two carcass plies to suppress local bending deformation, whereby the pinch cut resistance can be improved. Further, since the outer carcass ply is composed of only a body portion and is superposed on a body portion of the inner carcass ply, increase of the tire rigidity can be suppressed as small as possible. Furthermore, since the bending center in deformation of bead is shifted toward the carcass side by appropriateness of balance in hardness between the bead apex rubber and the clinch rubber and, also, in cooperation with that the turnup height Lc of the inner carcass ply is held 60% or less of the section height L of the tire, the increase of the tire rigidity can be further suppressed, so it is possible to suppress deterioration of ride comfortability and noise performance.

EXPLANATION OF SYMBOLS

Figure 1:
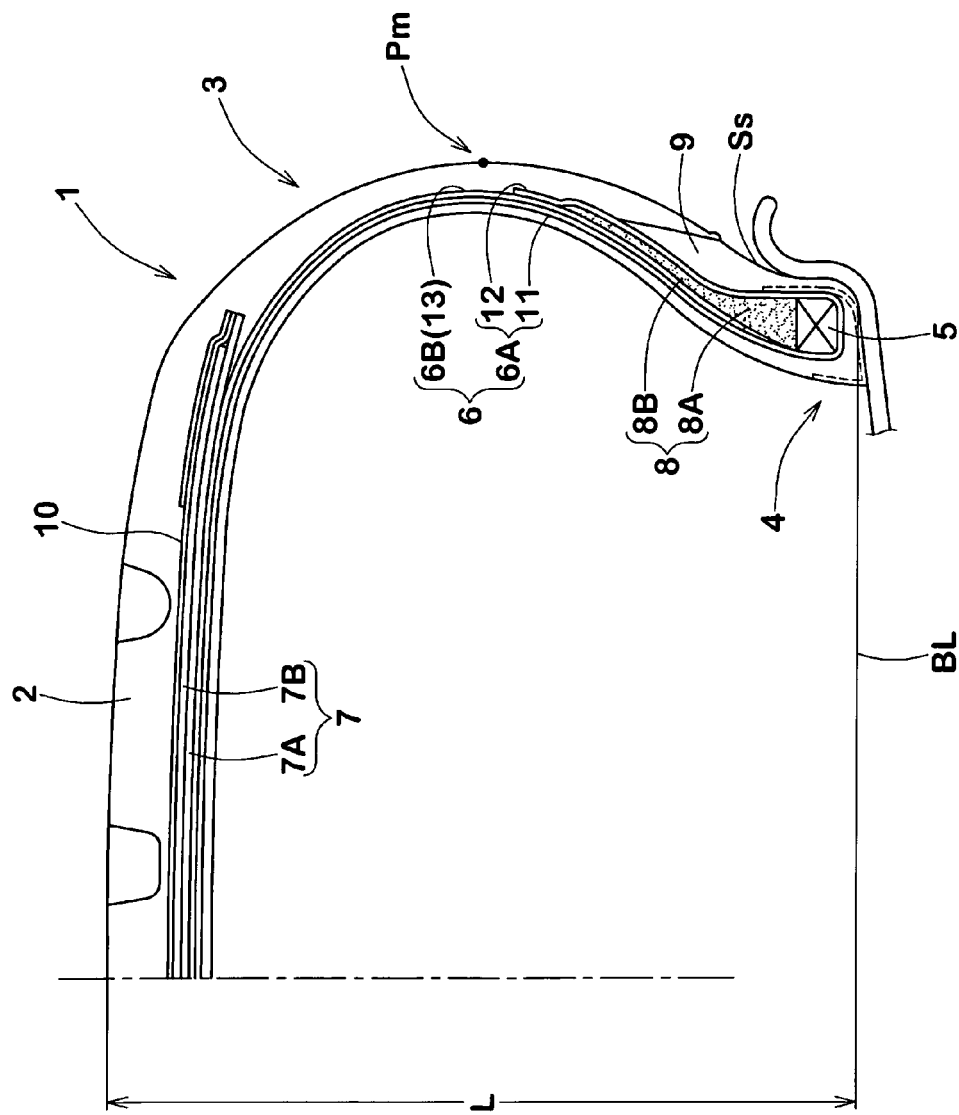
FIG. 1 is a cross sectional view of a pneumatic tire illustrating an embodiment of the present invention.

2. Tread portion
3. Sidewall portion
4. Bead portion
5. Bead core
6. Carcass
6A. Inner carcass ply
6B. Outer carcass ply
8. Bead apex rubber
8A. Apex main part
8B. Wing part
9. Clinch rubber
9M. Maximum thickness portion
11. Body portion
12. Turnup portion
13. Body portion
Mp. Thickness center

BEST MODE FOR CARRYING OUT THE INVENTION

An embodiment of the present invention will now be explained with reference to the accompanying drawings.

As shown in FIG. 1, a pneumatic tire 1 in this embodiment is a low aspect ratio radial tire for passenger cars having an aspect ratio of 50% or less, and includes a carcass 6 extending from a tread portion 2 to bead cores 5 in bead portions 4 through sidewall portions 3, bead apex rubbers 8 extending radially outward from the bead cores 5, and clinch rubbers 9 for preventing slippage of a rim which are disposed axially outward of the bead apex rubbers 8 to form outer surfaces of the bead portions 4. A strong belt layer 7 extending radially outward of the carcass 6 in the circumferential direction of tire is disposed in the tread portion 2.

The belt layer 7 comprises at least two belt plies, two belt plies 7A and 7B in this embodiment, in each of which very strong belt cords, e.g., steel cords, are arranged at an angle of, for example, 10 to 35° with respect to the tire circumferential direction. The belt plies are stacked so that the belt cords in one ply intersect the cords in the other belt ply, whereby the rigidity of the belt is enhanced to strongly reinforce the tread portion 2 with a hoop effect. Further, in order to enhance the high speed durability, a band layer 10 in which a band cord of an organic fiber such as nylon is spirally wound at an angle of 5° or less with respect to the circumferential direction, may be disposed radially outward of the belt layer 7. As the band layer 10 can be suitably used a pair of right and left edge band plies which are disposed to cover only axially outer edge portions of the belt layer 7, and a full band ply which covers approximately full width of the belt layer 7. In this embodiment is exemplified a combination use of a pair of right and left edge band plies and a single full band ply.

The carcass 6 comprises two radially inner and outer carcass plies 6A and 6B in which carcass cords are arranged at an angle of, for example, 70 to 90° with respect to the tire circumferential direction. As a carcass cord are suitably used known organic fiber cords such as nylon, polyester, rayon and the like.

The inner carcass ply 6A is formed into a so-called turnup type carcass ply including a body portion 11 extending between the bead cores 5, 5, and turnup portions 12 that are continuous with the body portion 11 and are turned up around the bead cores 5 from the axially inside to the axially outside of the tire to thereby anchor the carcass ply. Between this body portion 11 and the turnup portion 12 is disposed a hard bead apex rubber 8 extending radially outwardly from the bead core 5.

The outer carcass ply 6B is composed of only a body portion 13 which extends along the outer surface of the body portion 11 of the inner carcass ply 6A from the tread portion 2 toward a radially inward beyond a tire maximum width position Pm. The radially inner ends of this body portion 13 are sandwiched between the body portion 11 of the inner carcass ply 6A and the bead apex rubbers 8 to terminate there.

Figure 2:
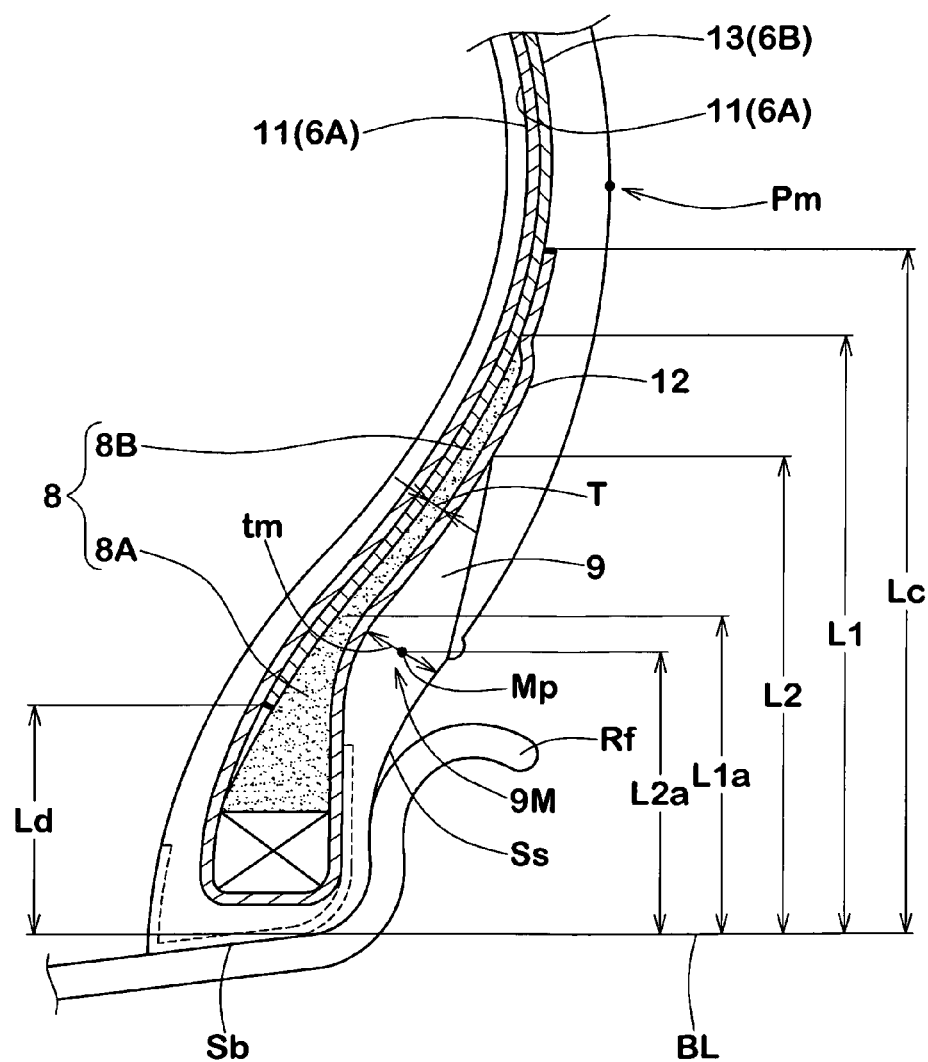
FIG. 2 is a cross sectional view illustrating a bead portion in an enlarged form.

As shown in FIG. 2 in an enlarged form, the turnup height Lc which is a radial height from a bead base line BL up to a radially outer end of the turnup portion 12 of the inner carcass ply 6A is set to 60% or less of the section height L (shown in FIG. 1) of the tire. Also, the inner end height Ld which is a radial height from the bead base line BL up to a radially inner end of the body portion 13 of the outer carcass ply 6B is set to 60% or less of the apex height L1 which is a radial height from the bead base line BL up to a radially outer end of the bead apex rubber 8.

Like this, in the carcass 6 of this embodiment, a neighborhood of the tire maximum width position Pm at which deflection becomes maximum and accordingly pinch cut is easy to occur, is reinforced by two plies of the body portions 11 and 13 in the same manner as a conventional carcass structure of two plies, whereby local bending deformation is suppressed to suppress generation of pinch cut. Further, in the carcass 6, the outer carcass ply 6B is formed of only the body portion 13, and both the inner end height Ld of the outer carcass ply 6B and the turnup height Lc of the inner carcass ply 6A are set as mentioned above. Therefore, the tire rigidity can be reduced, so it is possible to suppress deterioration of the ride comfortability and the noise performance such as road noise affecting the resonance frequency in the circumferential direction of tire. If the turnup height Lc is more than 60% of the tire section height L, the tire rigidity becomes large and accordingly it is difficult to suppress the deterioration of the noise performance and the ride comfortability. If the inner end height Ld of the outer carcass ply is more than 60% of the apex height L1, the pinch cut-suppressing effect is not sufficiently exhibited and, in addition, the tire rigidity is decreased to bring about deterioration of the steering stability. Further, if the turnup height Lc is too small, as well as incurring a disadvantage in the steering stability, there is a tendency that a compressive stress acts on the outer end of the turnup portion 12 at the time of bead deformation to lower the bead durability. From such points of view, it is preferable that the turnup height Lc is at least 35% of the tire section height L. Also, from the viewpoints of securing the ride comfortability and weight reduction of tire, it is preferable that the inner end height Ld of the outer carcass ply is at least 20% of the apex height L1.

In order to further enhance the effect of suppressing deterioration of the noise performance and the ride comfortability while securing a high pinch cut-suppressing effect, the bead apex rubber 8 is made up of an apex main part 8A having an approximately triangular cross section which extends radially outwardly in a tapered manner from the bead core 5, and a thin wing part 8B which is continuous with the apex main part 8A and extends radially outwardly therefrom with a substantially constant thickness T. The thickness T is within the range of 0.8 to 1.5 mm. The apex height L1 of the bead apex rubber 8 is from 30 to 40% of the tire section height L, and the apex main part height L1a which is a radial height from the bead base line BL up to a radially outer end of the apex main part 8A is from 25 to 35% of the apex height L1. The expression "substantially constant thickness T" means that, for example, fluctuation in thickness of ±10% resulting from a tire manufacturing step such as vulcanization formation, and thickness fluctuation or change resulting from tapering an outer end portion are permissible.

Like this, the bead apex rubber 8 is provided with the thin wing part 8B radially outward of the apex main part 8A, while the apex main part 8A is formed to have a small height. Therefore, it is possible to reduce the tire vertical rigidity (vertical spring), while securing a necessary tire lateral rigidity (lateral spring) to maintain the steering stability. Thus, deterioration of noise and ride comfort performances can be more highly suppressed. If the apex main part height L1a is less than 25% of the apex height L1, no sufficient bead rigidity is obtained to cause deterioration of the steering stability, and if it is more than 35%, a large strain concentration occurs at the radially outer end of the apex main part 8A and it is disadvantageous in durability. Further, if the apex height L1 is less than 30% of the tire section height L, no sufficient lateral rigidity is obtained to cause deterioration of the steering stability, and if it is more than 40%, damages are easy to occur from the radially outer end of the bead apex rubber 8 since the radially outer end approaches the tire maximum width position Pm at which the flexure reaches maximum. If the thickness T is less than 0.8 mm, the steering stability is impaired since the tire lateral rigidity is secured, and if the thickness T is more than 1.5 mm, the vertical rigidity becomes large, so the resonance frequency in the tire circumferential direction is particularly increased to bring about deterioration of road noise.

The clinch rubber 9 stands up radially outwardly from a bottom surface Sb of the bead portion 4. In at least a region contacting a rim flange Rf, the clinch rubber 9 is exposed to the outside to form an outer surface Ss of the bead portion 4. The clinch rubber 9 has a maximum thickness part 9M at which the thickness "t" of the clinch rubber 9 becomes maximum, and from the maximum thickness part 9M it further extends radially outwardly with gradually decreasing the thickness. The clinch height L2 which is a radial height from the bead base line BL up to a radially outer end of the clinch rubber 9 is set to a range of 70 to 85% of the apex height L1. The maximum thickness "tm" at the maximum thickness part 9M is from 4.0 to 5.0 mm. The maximum thickness part height L2a which is a radial height from the bead base line BL up to a thickness center Mp of the maximum thickness part 9M is from 65 to 95% of the apex main part height L1a.

If the clinch height L2 is less than 70% of the apex height L1, the steering stability is deteriorated because of lack of the tire lateral rigidity, and if it is more than 85%, radially outer ends of the clinch rubber 9 and bead apex rubber 8 approach each other, so a large strain concentration occurs at these ends and it is disadvantageous in durability. If the maximum thickness "tm" is less than 4.0 mm, the steering stability is deteriorated because of lack of the tire lateral rigidity, and if it is more than 5.0 mm, the rigidity becomes too large, so the contact pressure with the rim flange Rf becomes insufficient.

If the maximum thickness part height L2a is outside the range of 65 to 95% of the apex main part height L1a, the durability tends to be impaired since, for example, the clinch rubber is easy to bend at the radially outer end of the bead apex main part 8A to cause strain concentration.

The rubber hardness Hs1 of the bead apex rubber 8 is from 80 to 95. The rubber hardness Hs2 of the clinch rubber 9 is selected from a range of 65 to 85 so as to be lower than the rubber hardness Hs1. Like this, since the bead apex rubber 8 is made from a rubber harder than the clinch rubber 9 to optimize a rubber hardness balance, the bending center (center of stress) in bead deformation can be shifted from a tire outer surface side toward a body portion side of the carcass plies 6A and 6B. Therefore, local stress acting on the body portions 11 and 13 at the time of deformation of bead can be decreased to suppress damages such as breaking of carcass cords. Thus, in cooperation with the above-mentioned carcass structure, a higher effect is exerted on suppression of pinch cut. Further, since bending deformation is dispersed to a wide range, it is also advantageous in noise performance and ride comfortability. Particularly, since, in this embodiment, the bead apex rubber 8 is provided with the wing part 8B, the stress center in the bending deformation can be shifted to a larger extent toward the above-mentioned body portion side, so the effect of suppressing pinch cut and the effect of improving the noise performance and the ride comfortability can be exhibited on higher levels.

For these purposes, it is preferable that the difference between the above-mentioned hardnesses (Hs1−Hs2) is at least 2.0, especially at least 5.0. If the rubber hardness Hs2 of the clinch rubber 9 is less than 65, the rigidity is insufficient, and if it is more than 85, the clinch rubber is too hard, so the toughness is reduced to deteriorate the fatigue resistance and it is also disadvantageous in ride comfortability and so on. Therefore, it is preferable that the rubber hardness Hs2 is less than 80.

In this embodiment, the body portion 13 of the outer carcass ply 6B terminates on the inner surface of the apex main part 8A, but it may terminate on the inner surface of the wing part 8B.

A particularly preferable embodiment of the present invention has been described, but the present invention can be carried out with modifications into various embodiments without being limited to the embodiment shown in the drawings.

EXAMPLES

Low aspect ratio tires for passenger cars having a tire size of 225/45R17 and having the structure shown in FIG. 1 were manufactured based on the specifications shown in Table 1, and tested with respect to vertical spring, lateral spring, steering stability, ride comfortability, noise performance, and pinch cut resistance. The results are shown in Table 1.

(1) Lateral Spring and Vertical Spring

A vertical load of 4.1 kN was applied to a tire mounted on a rim (17×8JJ) and inflated to an inner pressure of 230 kPa, and the vertical deflection was measured. The vertical spring constant was obtained by dividing the vertical load by the vertical deflection. Also, a vertical load of 4.1 kN and a lateral force of 2.0 kN were applied to the tire, and the lateral deflection of the tire was measured. The lateral spring constant was obtained by dividing the lateral force by the lateral deflection. The spring constants are shown as an index based on the results of Conventional Example 1 regarded as 100.

(2) Steering Stability and Ride Comfortability

Tires were attached to all wheels of a vehicle (Japanese 2,000 cc FR car) under conditions of rim 17×8JJ and inner pressure 230 kPa. The vehicle was run on a dry asphalt road of a tire test course, and the steering stability and ride comfortability were evaluated by test driver's feeling. They were evaluated by a 10 points rating scale in which the result of Conventional Example 1 was regarded as 6. The larger the value, the better the performance.

(3) Noise Performance (Road Noise Performance)

The vehicle was allowed to run at 60 km/h on a road noise measuring road (asphalt rough surface road) under the condition of a single ride, and a noise in the vehicle was evaluated by driver's feeling. The results are shown as an index based on the result of Conventional Example 1 regarded as 100. The larger the value, the better the noise performance.

(4) Pinch Cut Resistance

A steel projection having a height of 110 mm, a width of 100 mm and a length of 1,500 mm was fixed onto a shoulder of a test course. The above-mentioned vehicle was run over the steel projection at an approaching angle of 15° with respect to the longitudinal direction of the projection. This crossing over test was repeated with increasing the approaching speed by 1 km/hour every test, starting from 15 km/hour, and the speed at which a tire got punctured was measured. The results are shown as an index based on the result of Conventional Example 1 regarded as 100. The larger the value, the better.

TABLE 1

|  | Conventional Example 1 | Conventional Example 2 | Com. Ex. 1 | Com. Ex. 2 | Com. Ex. 3 | Example 1 | Example 2 |
|---|---|---|---|---|---|---|---|
| Inner carcass ply | Turnup | Turnup | Turnup | Turnup | Turnup | Turnup | Turnup |
| Turnup height Lc/L (%) | 55 | 55 | 55 | 70 | 55 | 55 | 55 |
| Outer carcass ply | — | Turnup | No turnup | No turnup | No turnup | No turnup | No turnup |
| Inner end height Ld/L1 (%) | — | — | 43 | 30 | 43 | 43 | 38 |
| Bead apex rubber |  |  |  |  |  |  |  |
| Presence of wing part | no | no | no | yes | yes | yes | yes |
| Wing part thickness T*1 (mm) | 3.0 | 3.0 | 3.0 | 1.0 | 1.0 | 1.0 | 1.0 |
| Apex height L1/L (%) | 35 | 35 | 35 | 50 | 35 | 35 | 40 |
| Apex main part height L1a/L1 (%) | 100 | 100 | 100 | 30 | 50 | 30 | 30 |
| Clinch rubber |  |  |  |  |  |  |  |
| Clinch height L2/L1 (%) | 70 | 70 | 70 | 70 | 70 | 70 | 80 |
| Maximum thickness part height L2a/L1a (%) | — | — | — | 80 | 80 | 80 | 80 |
| Maximum thickness tm (mm) | 4.5 | 4.5 | 4.5 | 4.5 | 4.5 | 4.5 | 4.5 |
| Rubber hardness Hs1 | 92 | 92 | 92 | 92 | 92 | 92 | 92 |
| Rubber hardness Hs2 | 75 | 75 | 75 | 75 | 75 | 75 | 75 |
| Lateral spring | 100 | 110 | 108 | 107 | 104 | 102 | 101 |
| Vertical spring | 100 | 110 | 107 | 105 | 104 | 102 | 101 |
| Steering stability | 6.0 | 6.5 | 6.5 | 6.0 | 6.0 | 6.0 | 6.0 |
| Ride comfortability | 6.0 | 4.0 | 5.0 | 5.5 | 5.5 | 6.0 | 6.0 |
| Noise performance | 100 | 90 | 95 | 97 | 98 | 100 | 100 |
| Pinch cut resistance | 100 | 115 | 112 | 112 | 112 | 109 | 106 |

|  | Example 3 | Example 4 | Example 5 | Com. Ex. 4 | Com. Ex. 5 | Com. Ex. 6 | Com. Ex. 7 |
|---|---|---|---|---|---|---|---|
| Inner carcass ply | Turnup | Turnup | Turnup | Turnup | Turnup | Turnup | Turnup |
| Turnup height Lc/L (%) | 55 | 55 | 55 | 55 | 55 | 55 | 55 |
| Outer carcass ply | No turnup | No turnup | No turnup | No turnup | No turnup | No turnup | No turnup |
| Inner end height Ld/L1 (%) | 38 | 43 | 43 | 140 | 43 | 43 | 43 |
| Bead apex rubber |  |  |  |  |  |  |  |
| Presence of wing part | yes | yes | yes | yes | yes | yes | yes |
| Wing part thickness T*1 (mm) | 1.0 | 1.0 | 1.0 | 1.0 | 1.0 | 1.0 | 1.0 |
| Apex height L1/L (%) | 40 | 35 | 35 | 35 | 35 | 35 | 35 |
| Apex main part height L1a/L1 (%) | 30 | 30 | 30 | 30 | 30 | 30 | 30 |
| Clinch rubber |  |  |  |  |  |  |  |
| Clinch height L2/L1 (%) | 70 | 70 | 70 | 70 | 70 | 70 | 80 |
| Maximum thickness part height L2a/L1a (%) | 80 | 60 | 100 | 80 | 80 | 80 | 80 |
| Maximum thickness tm (mm) | 4.5 | 4.5 | 4.5 | 4.5 | 4.5 | 4.5 | 4.5 |
| Rubber hardness Hs1 | 92 | 92 | 92 | 92 | 75 | 92 | 80 |
| Rubber hardness Hs2 | 75 | 75 | 75 | 75 | 70 | 60 | 85 |
| Lateral spring | 102 | 100 | 104 | 97 | 97 | 97 | 98 |
| Vertical spring | 101 | 100 | 103 | 98 | 97 | 97 | 98 |
| Steering stability | 6.0 | 6.0 | 6.0 | 5.0 | 5.0 | 5.0 | 5.5 |
| Ride comfortability | 6.0 | 6.0 | 6.0 | 6.5 | 6.5 | 6.5 | 6.0 |
| Noise performance | 100 | 100 | 100 | 102 | 103 | 102 | 102 |
| Pinch cut resistance | 109 | 104 | 106 | 103 | 100 | 100 | 103 |

*1 In case of having no wing part, thickness T1 denotes a thickness of the bead apex rubber at a height position of 0.8 × L1.

It is confirmed that although tires of the Examples are greatly improved in pinch cut resistance with keeping deterioration of the ride comfortability and noise performance low on approximately the same level as those obtained by a single carcass ply structure.

What is claimed is:

1. A pneumatic tire having an aspect ratio of 50% or less and including a carcass extending from a tread portion to bead cores in bead portions through sidewall portions, bead apex rubbers extending radially outward from the bead cores, and clinch rubbers for preventing slippage of a rim which are disposed axially outward of the bead apex rubbers to form outer surfaces of the bead portions, wherein:

the carcass comprises an inner carcass ply including a body portion extending between the bead cores and turnup portions which are continuous with the body portion and are turned up around the bead cores from the axially inward to the axially outward of the tire, and an outer carcass ply including a body portion which extends along the outer surface of the body portion of the inner carcass ply and the radially inner ends of which are sandwiched between the body portion of the inner carcass ply and each of the bead apex rubbers to terminate there, the turnup portions of the inner carcass ply are located between the clinch rubbers and the bead apex rubbers and in contact with them, the turnup radial height Lc between a radially outer end of the turnup portion of the inner carcass ply and the bead base line is 60% or less of the section height L of the tire and is larger than the apex radial height L1 between a radially outer end of the bead apex rubber and the bead base line, the inner end radial height Ld between a radially inner end of the body portion of the outer carcass ply and the bead base line is 60% or less of the apex radial height L1, and the clinch rubber radial height L2 between a radially outer end of the clinch rubber and the bead base line is from 70 to 85% of the apex radial height L1, and the radially outer end of the clinch rubber is in contact with the turnup portion of the inner carcass play, wherein the bead apex rubbers have a rubber hardness Hs1 of 80 to 95, and the clinch rubbers have a rubber hardness Hs2 which falls within the range of 65 to 85 and is lower than the rubber hardness Hs1, and wherein the bead apex rubbers comprise an apex main part having an approximately triangular cross section which extends radially outwardly in a tapered manner from the bead core, and a thin wing part having a substantially constant thickness T within the range of 0.8 to 1.5 mm which is continuous with the apex main part and extends radially outwardly therefrom, the apex height L1 is from 30 to 40% of the tire section height L, and the apex main part radial height L1a between a radially outer end of the apex main part and the bead base line is from 25 to 35% of the apex height L1.

2. The pneumatic tire of claim 1, wherein the clinch radial height L2 between a radially outer end of the clinch rubber and the bead base line is from 70 to 85% of the apex height L1, and the clinch rubber has a maximum thickness part at which the thickness of the clinch rubber becomes maximum, and in which the maximum thickness part height L2a between the thickness center of the maximum thickness part and the bead base line is from 65 to 95% of the apex main part height L1a, and the maximum thickness of the maximum thickness part is from 4.0 to 5.0 mm.

* * * * *